United States Patent [19]

Glennon et al.

[11] Patent Number: 4,671,116

[45] Date of Patent: Jun. 9, 1987

[54] FLUID PRESSURE TRANSDUCER

[75] Inventors: Thomas F. Glennon, Darien; Brian T. Creed, Elmhurst; William J. Walsh; Robert G. Sokalski, both of Wheaton, Ill.

[73] Assignee: Eaton Corporation, Cleveland, Ohio

[21] Appl. No.: 676,701

[22] Filed: Nov. 30, 1984

[51] Int. Cl.[4] .................. G01L 7/08; G01L 9/10
[52] U.S. Cl. .......................... 73/728; 73/714; 200/83 P; 336/30; 331/65
[58] Field of Search .............. 73/728, 722, 714; 336/30; 331/65; 200/83 P; 307/118

[56] References Cited

U.S. PATENT DOCUMENTS

| | | | |
|---|---|---|---|
| 3,730,146 | 5/1973 | Moulds et al. | 73/728 |
| 3,958,558 | 5/1976 | Dunphy et al. | 73/728 |
| 4,024,484 | 5/1977 | Tomczak et al. | 73/728 |
| 4,072,927 | 2/1978 | O'Neil | 340/58 |
| 4,110,732 | 8/1978 | Jarocha et al. | 340/58 |
| 4,112,365 | 9/1978 | Larson | 324/173 |
| 4,175,443 | 11/1979 | Schneider et al. | 73/722 |
| 4,349,746 | 9/1982 | Grossner et al. | 307/106 |
| 4,356,732 | 11/1982 | Hachtel et al. | 73/862.33 |
| 4,399,606 | 8/1983 | Buckshaw | 73/728 |
| 4,456,801 | 6/1984 | Lauritsen et al. | 200/83 P |

Primary Examiner—Donald O. Woodiel
Attorney, Agent, or Firm—D. A. Rowe; R. A. Johnston

[57] ABSTRACT

A pressure transducer of the type providing a continuous electrical output signal indicative of the variation in sensed pressure having a metallic preferably aluminum armature attached for movement with a resilient pressure responsive diaphragm. A resonant circuit includes a coil disposed adjacent the armature and an oscillator provides current flow in the coil which generates eddy currents in the armature; and, movement of the diaphragm and armature causes the eddy currents therein to alter the effective inductive reactance of the coil and shift the frequency of resonance of the circuit. Circuit means are provided to emit an output signal indicative of the frequency shift for enabling a continuous determination to be made of the sensed pressure on the diaphragm. An auxiliary snap-action switch is provided remotely from the diaphragm and is actuated by a non-metallic rod from the armature passing through the central region of the coil. The circuitry is preferably mounted on a p.c. board disposed to have the switch rod pass therethrough.

35 Claims, 7 Drawing Figures

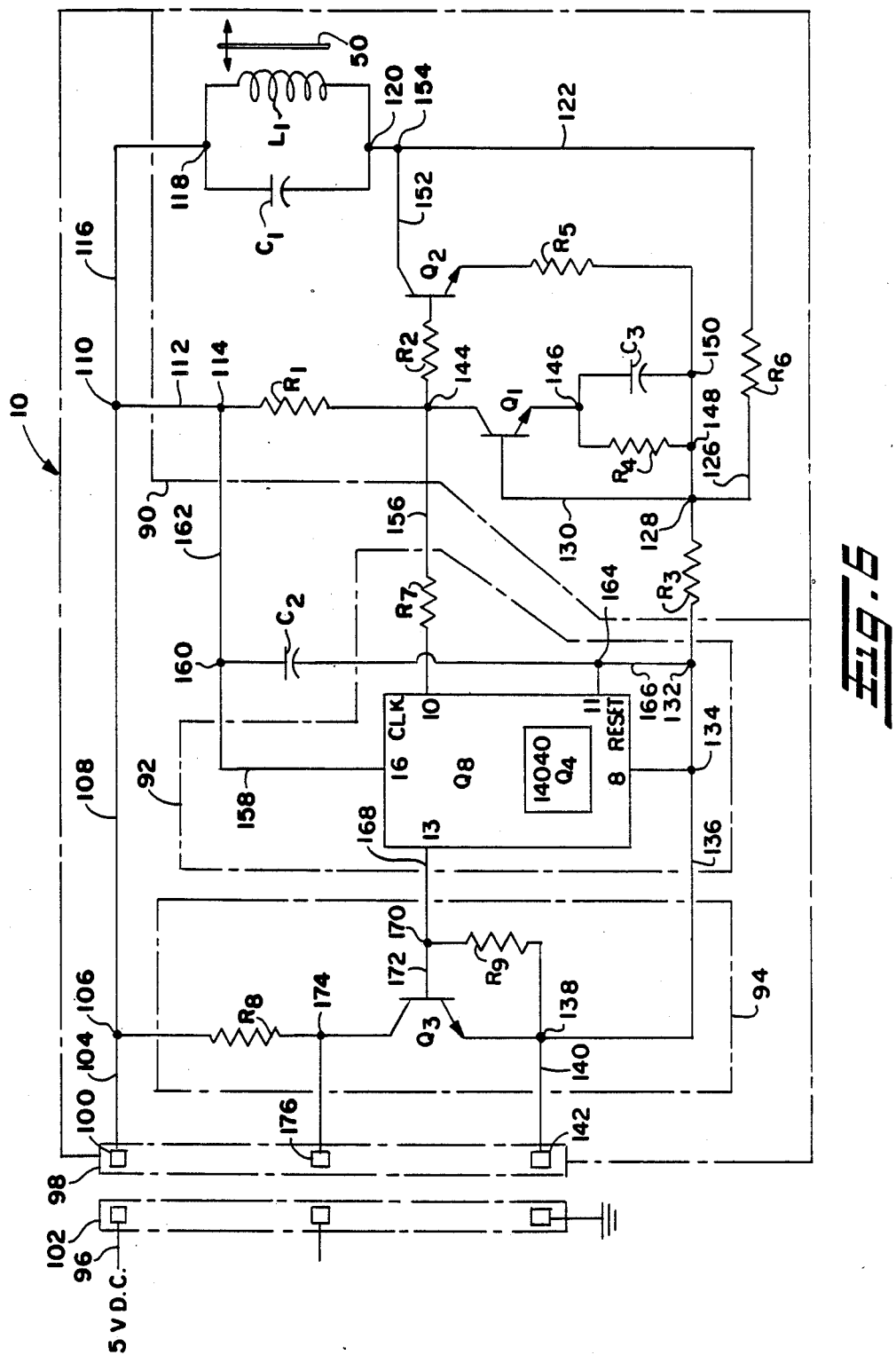

FLUID PRESSURE TRANSDUCER

BACKGROUND OF THE INVENTION

The present invention relates to sensing and monitoring fluid pressure in a control system of the type having electrically operated control devices for performing various functions during the operation of an apparatus to be controlled.

In certain applications, as for example water level sensing in domestic appliances such as household washing machines, it is required to provide a sensor or transducer which is relatively inexpensive. Heretofore, such devices have comprised diaphragm actuated snap action switches for single level sensing of tub overfill, whereby actuation of the snap acting switch mechanism breaks a circuit to an electrically controlled water fill valve and/or energizes a drain valve or drain pump. The aforesaid type snap acting pressure switches for washing machines have typically been employed in washing machines having a timer actuated program cam for sequencing a series of electrical switches for controlling machine operations during the service or duty cycle of the washing machine.

However, it has been desired to provide control of a domestic washing machine in a manner employing solid state circuitry, and in particular a microprocessor, and thereby eliminate the need of the electromechanical programmer/timer. In utilizing such a microprocessor controller for a washing machine, it is necessary to provide a continuous electrical signal for monitoring the level of water in the washing machine tub. Thus the need has arisen for a low cost, relatively simple, water level sensor or transducer which has a high degree of sensitivity to changes in fluid pressure at low pressure levels as would be represented by the difference in the hydrostatic head of the water in a washing tub.

Fluid pressure sensors or transducers which provide a continuous electrical signal indicative of sensed fluid pressure are known in the art and various techniques have been employed. In particular, it is known to provide a diaphragm acting against a piezo electric crystal for providing a continuous electrical output proportional to the diaphragm force acting against the piezo electric device. Also, it is known to provide a fluid pressure responsive diaphragm acting against a slider block for moving a plurality of electrical wiper contacts along contact strips mounted on a printed circuit board, with the contact strips staggered for digitally coded output. In devices of this latter type, the length and spacing of the contact strips determine the increments of movement, and therefore pressure increment which must occur before the change in signal output is provided. The incremental pressure change sensitivity of such devices is thus necessarily quite limited.

Furthermore, piezo electric devices are complicated and costly to manufacture and generally it has been found difficult to provide such a device having high resolution or sensitivity for low pressure sensing and to have such a device lend itself to low cost manufacturing techniques.

SUMMARY OF THE INVENTION

The present invention provides a sensor or transducer for monitoring fluid pressure at relatively low levels and having an electrical signal output indicative of changes in the sensed fluid pressure with substantially infinite resolution of the changes in fluid pressure. The novel transducer described herewithin, has a metallic armature disposed adjacent the end of an electrically conductive coil connected in a tuned circuit. The metallic armature is operatively connected to a pressure responsive diaphragm for movement therewith in response to changes in the sensed fluid pressure.

An oscillator provides an alternating current signal to the tuned coil circuit; and, current flow in the coil creates eddy currents in the metallic armature adjacent the coil. Movement of the armature caused by changes in fluid pressure acting against the diaphragm cause the armature to move with respect to the coil. The eddy currents in the armature affect the inductive reactance of the coil thereby detuning the coil circuit and acting to change the frequency, of the oscillator.

Suitable dividing and buffer circuitry conditions the oscillator signal to provide a continuous output signal indicative of the changes in the oscillator frequency thereby yielding an electrical output signal proportional to the change in positions of the armature and thus, changes in fluid pressure.

The present invention thus provides the unique and novel fluid pressure transducer which is extremely simple in construction and relatively low in cost of manufacturing and yet provides such a transducer having a continously variable high resolution electrical output in response to small changes in sensed fluid pressure.

BRIEF DESCRIPTION OF THE DRAWINGS

FIG. 6 is an electrical schematic of the internal circuitry for the transducer of FIG. 1; and, FIG. 7 is a partial sectional view similar to FIG. 4 showing the details of the retention of the printed circuit board and coil bobbin to the housing.

DETAILED DESCRIPTION

Figure 2:
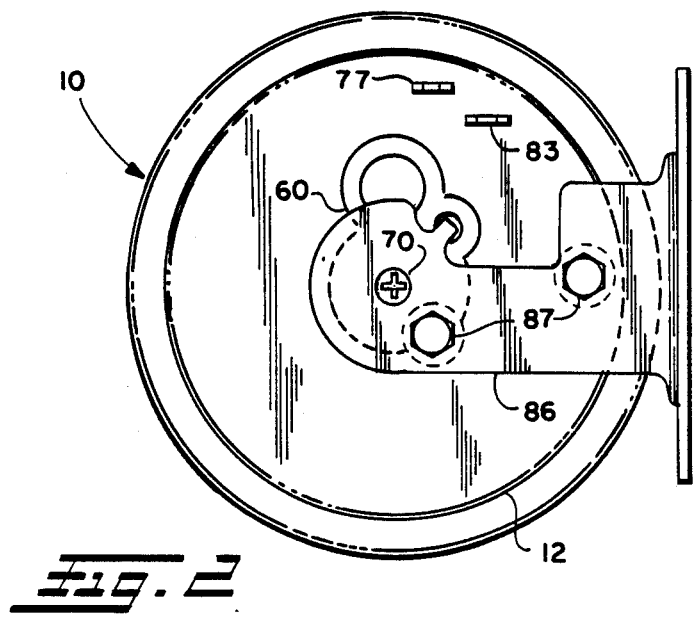
FIG. 2 is a plan view of the transducer of FIG. 1.
Figure 1:
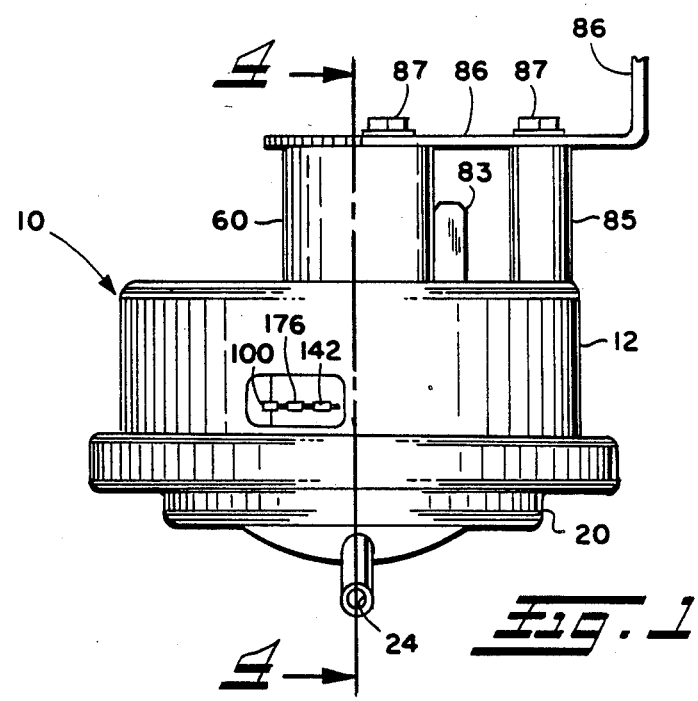
FIG. 1 is a side elevation view of the transducer.

Referring now to FIGS. 1, 2, 4 and 5, the transducer of the present invention is indicated generally at 10 and has a preferably plastic housing 12 with a preferably cup-shaped configuration. The flanged rim of the housing 12 has the peripheral groove 14 formed in the open end thereof and has a peripheral bead 16 formed about a resiliently flexible diaphragm 18 received in the groove 14. A cover member 20 has the rim thereof rolled or crimped over the flanged rim of the housing to retain and seal the bead 16 of the diaphragm about the rim of the housing. The cover 20 has a fluid pressure inlet fitting 22 formed thereon with a fluid pressure inlet port 24 provided therein. The inner surface of the cover thus forms a fluid pressure chamber 26 for sensing the fluid pressure applied to the inlet port 24 and to the diaphragm 18.

The closed end of the housing 12 has a plurality of depending posts, preferably three (3), two of which 28, 30 are shown in the drawings for supporting thereon a printed circuit board 32. The p.c. board 32 has located thereon the electrical circuitry which will be described hereinafter in greater detail with reference to FIGS. 3 and 6.

Figure 4:
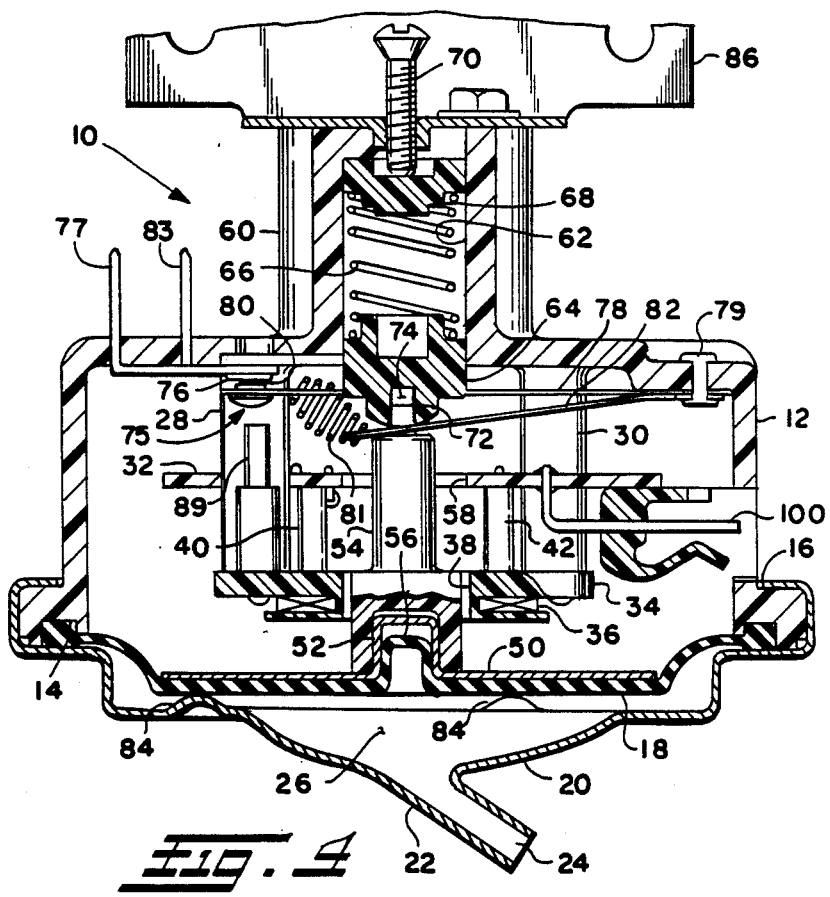
FIG. 4 is a cross sectional view taken along-section indicating lines 4—4 of the transducer of FIG. 1.
Figure 5:
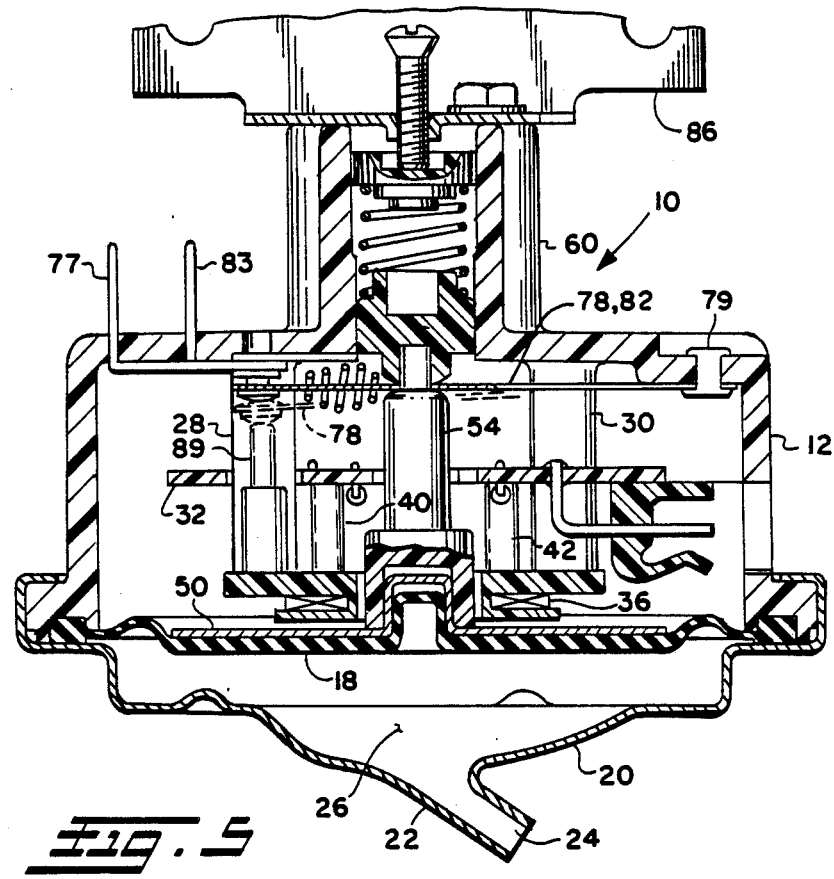
FIG. 5 is a view similar to FIG. 4, showing the diaphragm and armature in the displaced position for actuating the optional switch.
Figure 7:
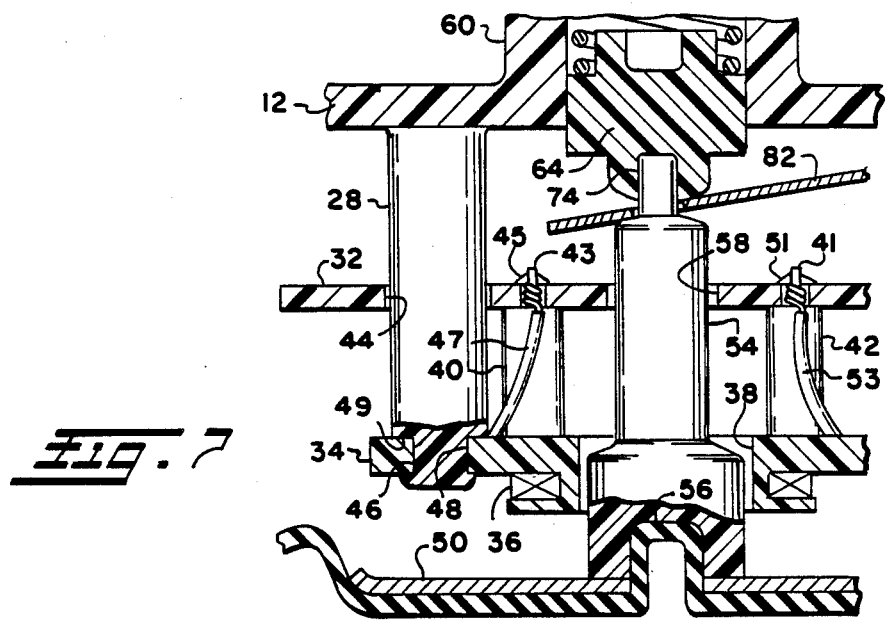

Referring to FIGS. 4, 5 and 7, a coil bobbin 34 is provided with a coil 36 of electrically conductive wire wrapped thereabout; and, the bobbin has a central bore 38 provided therethrough. Bobbin 34 has a plurality preferably three, of, circumferentially spaced posts extending upwardly therefrom as will be hereinafter described. The p.c. board 32 has a plurality of clearance apertures, one of which is shown typically at 44 in FIG. 7 formed therein, which apertures coincide in location with the arrangement of the posts on the housing.

Suitable projections are provided on each of the body posts, such as 28, 30, one of which projections is shown typically at 46 in FIG. 7 forming a shoulder 49 at the post 28. Each of the projections such as 46 is received in a suitable bore provided in the bobbin as shown typically by the bore 48. The p.c. board 32 is received over the body posts such as 28, 30; and, the bobbin 34 is received over each of the projections, such as 46, and is registered against the adjacent shoulder or step, shown typically at 49 in FIG. 7, and is retained thereover by a suitable expedient such as deformation of the end of each of the projections such as 46.

As aforementioned, the bobbin 34 also has a plurality, preferably three (3) circumferentially spaced upstanding posts provided thereon, of which are identified by reference numerals 40 and 42 in FIGS. 4, 5 and 7. At least two of the bobbin posts, such as 40, 42 each have a metallic pin provided thereon and extending longitudinally from the upper end thereof, as pins 41, 43 are shown in FIG. 7.

The p.c. board 32 has an aperture formed therein, for each of the pins 41, 43 as shown at 45, 51 in FIG. 7, for receiving each of the pins 41, 43. Each of the pins 41, 43, has one of the coil lead wires 47, 53 of coil 36 wrapped therearound for coil lead termination. The pins 41, 43 with the leads wrapped therearound are then inserted through the p.c. board in apertures 45, 53 and the p.c. board, with bobbin attached as a subassembly, is soldered to retain the pins 41, 43 in electrical contact with the p.c. board and to secure electrical contact between the wire coil leads and the pins. The p.c. board 32 is thus suspended intermediate the ends of housing posts 28, 30 by solder attachment to the bobbin post pins.

The diaphragm 18 has a backing plate 50 formed of metallic material, preferably aluminum, and also serves as an armature for coil 36. The armature plate 50 has a protuberance or projecting portion 52 provided centrally thereon which has received thereover in positive engagement therewith one end of an actuator post 54 formed preferably of plastic material. The diaphragm 18 also has a central projection 56 formed therein which is received in the underside of the projection 56 formed in plate 50 for registering the plate 50 centrally positioned on the diaphragm 18. The actuator post 54 extends upwardly and is received through a clearance aperture 58 providing in the p.c. board.

The upper closed wall of housing 12 has a boss 60 extending upwardly therefrom which has a bore 62 provided therein with a movable plunger 64 received therein and guided thereby. The plunger 64 is biased in a downward direction by a spring 66 having the lower end thereof registered against the plunger 64 with the upper end of the spring registered against a retaining plug 68. The retaining plug 68 preferably movably received in the bore 62 and retained therein and positioned by suitable adjustment screw 70 for adjusting the preload of spring 66 on plug 68.

The lower end of the plunger 64 has a recess 72 provided therein. Actuator 54 has a pilot portion 74 of reduced diameter formed on the upper end thereof, which pilot portion is received in plunger recess 72 such that for movement of the upper end of actuator 54 is guided by plunger 64.

Referring now to FIGS. 4 and 5, an optional auxiliary switching mechanism indicated generally at 75 is provided. Switch 75 has a stationary contact 76 which connected to a terminal strip 77 which extends externally through the wall of housing 12. Switch 75 has a movable blade member 78 which has one end thereof anchored to housing 12 by means of suitable fastener, such as rivet 79. The opposite free end of blade 78 has a movable contact 80 mounted thereon for making and breaking a circuit with stationary contact 76.

Movable blade 78 is contacted by a suitable toggle mechanism comprising a toggle compression spring 81 compressed between the end of a cutout (not shown) in the blade and the end of a switch actuation tang 82. The tang 82 has an aperture therein which has received therethrough the actuator pilot 74. Tang 82 is sandwiched between the pilot shoulder of actuator 54 and the end of plunger 64 for movement therewith. A second terminal lug or strip 83 is provided which extends externally of the housing 12 in spaced parallel relationship with terminal 77. It will be understood that a suitable electrical interconnection such as a wire or strip between the riveted end of blade 78 is provided, but that such interconnection has been omitted in FIGS. 4 and 5 for clarity.

With reference to FIG. 4, the switch 75 is shown in the normally closed position with the actuator 54 and switch tang 82 biased to the fullest downward position by spring 66 in the absence of a fluid pressure signal in chamber 26. It will be noted that the diaphragm 18 rests against suitable stop or bumper surfaces provided in the cover 20, which surfaces are illustrated in the form of dimples 84 in FIGS. 4 and 5.

With reference to FIG. 5, the actuator 54 is shown in its upwardmost position with a fluid pressure signal applied in chamber 26 such that switch tang 82 has been moved to its upward limit position causing spring 81 to be moved to a position of incipient toggle as shown in FIG. 5. Movable blade 78 is shown in its normally closed position at the instant before toggle, or snap, in solid outline in FIG. 5. After toggling, or snap actuation, switch blade 78 moves to the position indicated by dashed line in FIG. 5, thereby breaking the circuit between contacts 80, 76.

An auxiliary stop post 89 extends upwardly from the bobbin 34 for limiting the opening movement of movable contact 80.

With reference to FIGS. 1, 2, 4 and 5, a second boss 85 extends upwardly from the housing 12 in generally spaced parallel relationship to the central boss 60. A suitable mounting bracket 86 is retained against the ends of bosses 60, 85 by any convenient retaining means as for example screws 87. It will be understood that for convenience the adjustment screw for positioning plug 68 is threadedly engaged through the mounting bracket 86. It will be understood that the secondary mounting boss 85 may be freestanding, or may be interconnected with boss 60 by a suitable web (not shown).

Figure 3:
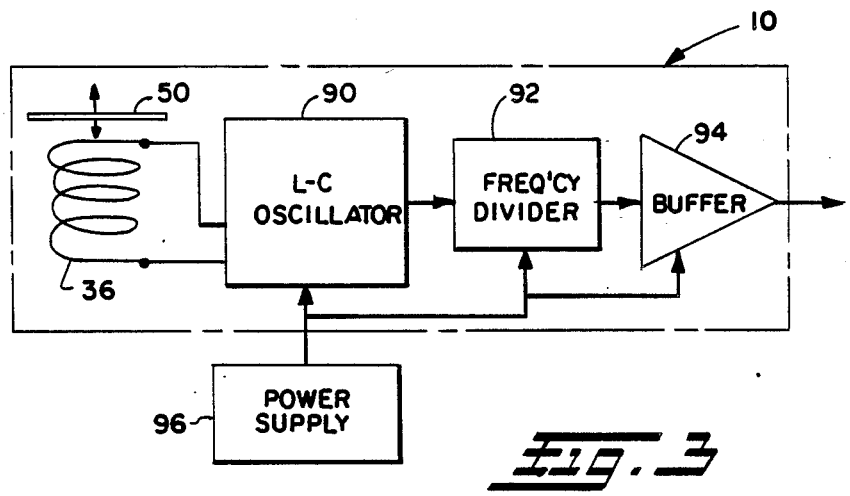
FIG. 3 is a block diagram of the function of the electrical signal processing of the transducer of the present invention.

Referring now to FIGS. 3 and 6, the transducer 10 contains therein circuitry for detecting the change in frequency of a tuned circuit responsive to movement of diaphragm and armature 50. The circuitry comprises an L-C oscillator 90 series connected to the coil 36 as will hereinafter be described, the output of which is connected to a frequency divider network 92. The output of the divider 92 which is conditioned by a buffer network 94 which provides the output signal from the transducer 10 to a suitable network (not shown) for converting the signal to values of fluid pressure on the diaphragm 50.

A suitable low voltage power supply, such as a five volt d.c. supply, is provided for supplying power to the circuitry components of the transducer 10, but otherwise forms no part of the present invention.

Referring to FIG. 6, the transducer 10 has a three pin connector 98 provided for external connection through the wall of housing 12 with pin 100 adapted to engage a corresponding pin on a mating connector 102 for connection to the power supply line 96.

Power supply pin 100 is connected via lead 104 to junction 106 which connects via lead 108 to a second power supply junction 110, which is connected via lead 112 to the junction 114 in the oscillator network 90. Junction 110 is also connected via lead 116 to junction 118 in the oscillator network 90. Junction 118 has one lead of the coil $L_1$ connected thereto, with the remaining lead thereof connected to junction 120. A capacitor $C_1$ is connected electrically in parallel with coil $L_1$ between junctions 118 and 120 to thereby form a tuned L-C circuit.

Junction 120 is connected via lead 122 and through resistor $R_6$, preferably 8.2K ohms, which connects through lead 126 to junction 128 and through lead 130 to the base of a switching device $Q_1$. Junction 128 is connected through resistor $R_3$, and through junctions 132, 134 and lead 136, to junction 138 which is connected via lead 140 to pin 142 of connector 98 which pin is grounded.

The collector of $Q_1$ is connected to junction 144 which is connected through resistor $R_1$ to power supply junction 114. The emitter of $Q_1$ is connected to junction 146 which is connected through resistor $R^4$ to junction 148; and, junction 146 is also connected through capacitor $C_3$ to junction 150. Junctions 148 and 150 are connected to junction 128. In the present practice of the invention, $R_1$ has a value of 3.9 kilo ohms, $R_3$ has a value of 1.8 kilo ohms, $R_4$ has a value of 1 kilo ohms and $C_3$ has a value of 0.01 microfarads.

Junction 144 is connected through resistor $R_2$ to the base of a second switch device $Q_2$ with the collector of $Q_2$ connected via lead 152 to junction 154 on lead 122. The emitter of $Q_2$ is connected through resistor $R_5$ to junction 150. In the present practice of the invention, $R_2$ has a value of 1k ohm and $R_5$ has a value of 2.2k ohms.

Junction 144 is connected through lead 156 into the dividing network 92 and through resistor $R_7$ to pin 10 of integrated circuit device $Q_8$ which pin is the clock line of device $Q_8$. Device $Q_8$ receives power through lead 158 which is connected to junction 160 which is connected to power junction 114.

Device $Q_8$ includes a CMOS integrated circuit counter device bearing EIA/JEDEC Solid State Products Council designation 4040.

With reference to FIGS. 3 and 6, in operation, the frequency of the oscillator is dependent upon the values of the inductive reactance of the coil $L_1$ and the capacitive reactance of $C_1$. The inductive reactance of the coil $L_1$ is varied by the proximity of armature 50. When current flows in coil $L_1$ eddy currents are generated in the armature plate 50 by virtue of the electromagnetic field generated by the current flow in coil $L_1$. The physical position of the armature 50 is changed by virtue of movement of diaphragm 18 in response to pressure changes in chamber 26 which in turn causes variations in the inductive reactance of coil $L_1$.

In the present practice of the invention, it has been found satisfactory to use a coil $L_1$ having an inductance of 2.3 millihenries with $C_1$ having a value of 0.01 microfarads.

When the voltage from the L-C circuit to the collector of $Q_2$ along lead 152 is high, $Q_2$ is OFF; and, $Q_1$ is ON. When the voltage to the collector of $Q_2$ is low, $Q_2$ is ON; and, $Q_1$ is OFF. $Q_1$ and $Q_2$ thus act as an oscillator in conjunction with associated resistors $R_2$, $R_5$, $R_4$, $R_6$ and capacitor $C_3$. The oscillator circuit of the present invention has been found satisfactory if the values of the resistors $R_1$, $R_4$, $R_6$ and capacitor $C_3$ are chosen to give an oscillator frequency of 50 kilo Hertz. In the presently preferred practice for a 50 KHZ oscillator, the movement of the armature plate 50 causes the oscillator frequency to vary between 32 and 50 kilo Hertz.

The network 92 functions as a divide-by-256 ($2^8$) counter; and, also protects the oscillator from external transients. $Q_3$, by the signal along line 172 at its base, also inverts the output of the divide network $Q_8$. $R_8$ serves as a current limiter and the switching of $Q_3$ by the signal at its base thus enables the buffer circuit 94 to provide a higher power output signal to pin 176 as well as protect the solid state device $Q_8$.

The signal output of buffer circuit 94 is thus an alternating or pulsing signal whose frequency is shifted an amount proportional to the change in position of armature plate 50. It will be understood that the device must be calibrated to determine the amount of frequency shift resulting from known position changes of the armature plate 50.

Output connection pins 100, 176, 142 comprise strips having a generally "L" shaped configuration, with one end connected to p.c. board 32 and supported thereon by a suitable bracket 180 formed of plastic or other insulating material. The pins 100, 176, 142 extend through bracket 180 in spaced parallel relationship, with only pin 100 illustrated in FIGS. 4 and 5.

The present invention thus provides a unique and novel fluid pressure transducer which provides a continous electrical output signal responsive to variations in fluid pressure applied to the transducer inlet port. The transducer of the present invention utilizes eddy currents in a metallic armature plate, movable by a pressure responsive diaphragm, to vary the inductance of a coil for shifting the frequency of an oscillator. The shift in oscillator frequency is detected and used as an output signal from which calculations may be made to derive the sensed fluid pressure acting on the diaphragm. The transducer of the present invention thus utilizes changes in position of an eddy current armature plate to provide the frequency shift signal from which the pressure may be determined from known relationships between the position of the armature plate and the fluid pressure sensed by the diaphragm.

Although the invention has hereinabove been described with respect to the illustrated embodiments, it will be understood that the invention is capable of modification and variation and is limited only by the following claims.

We claim:

1. A pressure transducer comprising:
   (a) housing means defining a fluid pressure chamber having a pressure signal inlet port adapted for receiving a fluid pressure signal;
   (b) pressure responsive means movable in response to pressure changes in said chamber;
   (c) metallic armature means disposed for movement with said pressure responsive means;
   (d) actuator means, formed of non-metallic material operatively connected to said armature means for movement therewith and extending therefrom in the direction of motion;
   (e) printed circuit means disposed on said housing means;
   (f) means defining a coil of electrically conductive material, said coil disposed with said actuator means movably received therethrough and with the end of said coil disposed adjacent said armature means;
   (g) electrical switch means mounted on said housing means and including stationary contact means and moveable contact means having said actuator means movably received therethrough and operative to be actuated by movement of said actuator means;
   (h) plunger means guided for said housing means for movement and having said actuator means operatively registered thereagainst.
   (i) means biasing said plunger means and said actuator means in a direction urging said armature means away from said coil; and,
   (j) detecting circuit means on said printed circuit means connected to said coil and operative upon connection to an electrical source provide an alternating current signal in said coil thereby generating eddy currents in said armature means, and including certain frequency in response to a predetermined pressure in said chamber, said chamber, said circuit means further including means operable, in response to pressure changes and movement of said armature means, to detect shifts in said frequency caused by said eddy currents acting on said coil;
   (k) electrical terminal means connected to said circuit means and adapted for external electrical connection thereto;

2. The transducer defined in claim 1, wherein said circuit means is retained on said housing means by said coil means.

3. The transducer defined in claim 1, wherein said coil is supported on said housing means in spaced relationship to said circuit means.

4. The transducer defined in claim 1, wherein said circuit means has an aperture formed therein with said actuator means movably received therethrough.

5. The transducer defined in claim 1, wherein said circuit means comprises a disc having a centrally disposed aperture formed therein with said actuator means movably received through said aperture.

6. A pressure transducer comprising:
   (a) housing means having a generally hollowed cylindrical configuration and defining a fluid pressure chamber therein with an inlet port adapted for receiving a fluid pressure signal;
   (b) pressure responsive means disposed in said housing means and movable in response to sensed pressure changes in said chamber
   (c) metallic armature means registered against said pressure responsive means and operable for movement therewith;
   (d) actuator means connected to said armature means and extending therefrom in the direction of movement of said pressure responsive means;
   (e) electrical switch means disposed on said housing means and having a movable member thereof operably contacted by said actuator means;
   (f) electrical coil means disposed in said housing means intermediate said armature means and said switch means with said actuator means movably received through said coil means with one end of said coil means disposed adjacent said armature means;
   (g) circuit means disposed within said housing means and operative upon connection to an electrical source, to apply an alternating current signal to said coil means and including means operable to resonate at a certain frequency in response to said a.c. signal and to generate eddy currents in said armature means, said circuit means including means operative to detect the shift in said frequency caused by pressure changes and movement of said armature means with respect to said coil means whereby said eddy currents act on said coil means said circuit means further operative to emit a signal indicative of the change in frequency;
   (h) electrical terminal means disposed on said housing means and connected to said circuit means, said terminal means adapted for connection thereto externally of said housing means.

7. The transducer defined in claim 6, wherein said circuit means includes a printed circuit board disposed intermediate said switch means and said pressure responsive means.

8. The transducer defined in claim 6 wherein, said circuit means includes printed circuit board means disposed intermediate said pressure responsive means and said switch means, with said coil means and on said printed circuit board means sharing a common mount.

9. The transducer defined in claim 6, wherein said circuit means includes a circuit board disposed intermediate said pressure responsive means and said switch means, with said coil means and said printed circuit board, retained on said housing means by a common retaining means.

10. The transducer defined in claim 6, wherein said circuit means includes a circuit board means mounted on said housing means disposed intermediate said pressure responsive means and said switch means, said circuit board having an aperture therein with said actuator means movably received through said aperture.

11. The transducer defined in claim 6, wherein said circuit means includes a circuit board disposed intermediate said pressure responsive means and said switch means.

12. The transducer defined in claim 6, wherein said actuator means includes pilot means received through said switch movable member and extending therebeyond; and, guide means received on said housing means and operatively connected to said pilot means for guiding movement of said actuator means.

13. The transducer defined in claim 6, wherein said circuit means includes printed circuit board means; said housing means includes a plurality of posts extending therefrom with said p.c. board received thereover and retained thereon, said p.c. board being disposed intermediate said coil means and said switch means.

14. The transducer defined in claim 6, wherein said circuit means includes a printed circuit board mounted on said housing intermediate said coil and said switch means; and, said terminal means includes a plurality of spaced rods, each having one end thereof connected to said p.c. board and the other end extending externally of said housing means.

15. The transducer defined in claim 6, wherein said armature means has portions thereof extending interiorly of said coil.

16. The transducer defined in claim 6, wherein said actuator means is formed of non-metallic material.

17. A pressure transducer comprising:
(a) housing means defining a fluid pressure chamber having an inlet port adapted for receiving a variable fluid pressure signal;
(b) pressure responsive means operable to provide movement with respect to said housing means to certain direction response to pressure changes in said chamber;
(c) armature means formed of metallic material and operatively contacting said pressure responsive means for movement therewith;
(d) actuator means operatively connected to said armature means and extending therefrom generally at said certain direction of movement;
(e) electrical switch means mounted on said housing means and including a movable member contacting said actuator means, said switch means being operable to make and break a set of contacts upon movement of said member by said actuator means in said direction;
(f) resonatable circuit means including coil means disposed in said housing means intermediate said armature means and said switch means with one axial and thereof adjacent said armature means;
(g) oscillator means, operable upon connection to a source of electrical power to provide an alternating current voltage signal to said resonatable circuit means whereby current flow in said coil means creates eddy currents in said armature means, said eddy currents affecting the resonance of said resonatable circuit means;
(h) detector circuit means operable to detect the shift in the frequency of resonance of said resonatable circuit means, said detector circuit means including signal generating means operable to emit a signal indicative of the position of said armature means;
(i) terminal means connected to said oscillator means and said detector circuit means, and adapted for connection thereto externally of said housing means.

18. The transducer defined in claim 17, wherein said resonatable means comprises a capacitive reactance in series circuit with said coil means.

19. The transducer defined in claim 17, further comprising printed circuit board means housing said oscillator means and said detector means thereon disposed intermediate said switch means and said pressure responsive means.

20. The transducer defined in claim 17, further comprising printed circuit board means for said oscillator means and said detector means, said p.c. board means disposed intermediate said switch means and said armature means and having an aperture therein with said actuator means movably received therethrough.

21. A pressure transducer comprising:
(a) housing means defining a fluid pressure chamber having an inlet port adapted for connection to a fluid pressure signal to be monitored;
(b) pressure responsive means operative to move in response to pressure changes in said chamber;
(c) armature means formed of metallic material and operatively contacting said pressure responsive means for movement therewith;
(d) resonant circuit means including coil means having one end thereof disposed adjacent said armature means, oscillatior means operative to cause resonance of said circuit means and including printed circuit means mounted on said coil means as a sub-assembly wherein current flow in said coil means generates eddy currents in said armature means and movement of said armature means causes changes in the inductive reactance of said coil means and thereby changes the frequency of said resonance;
(e) means operative, upon connection of said circuit means to an electrical power source, to provide an electrical signal indicative of the changes in position of said armature means.

22. The transducer defined in claim 21, further comprising electrical switch means and actuator means operatively connecting said pressure responsive means and said switch means for effecting actuation and deactuation of said switch means.

23. The transducer defined in claim 21, wherein said armature means comprises an aluminum plate member having a thickness relatively thin with respect to the dimensions thereof in the plane of the plate.

24. The transducer defined in claim 21, further comprising;
(a) electrical switch means with said coil means disposed intermediate said pressure responsive means and said switch means; and,
(b) actuator means received through said coil means and operatively connecting said pressure responsive means with said switch means for effecting actuation and deactuation thereof.

25. A pressure transducer comprising:
(a) housing means defining a fluid pressure chamber having an inlet port adapted for connection to a fluid pressure signal to be monitored;
(b) pressure responsive means movable in response to changes in the pressure in said chamber;
(c) armature means formed of metallic material and operatively connected for movement by said pressure responsive mean;
(d) resonant circuit means including coil means disposed adjacent said armature means;
(e) circuit means including printed circuit means mounted to said coil as a sub-assembly, said circuit means operative, upon connection to a source of power, to provide a resonant current in said coil means and induce eddy currents in said armature means, whereby movement of said armature means affects the reactance of said coil means and causes a change in the frequency of said resonant current; and,
(f) detector means connected to said circuit means and operative to emit an electrical signal indicative of the shift in said resonant frequency; and,
(g) terminal means connected to said detector means and said resonant circuit means extending through the wall of said housing means and adapted for external electrical connection thereto.

26. The tranducer defined in claim 25, further comprising electrical switch means received in said housing means with said coil means disposed intermediate said switch means and said pressure responsive means; and, actuator means operatively connecting said armature means and said switch means for effecting actuation and deactuation of said switch means in response to movement of said armature means.

27. The transducer defined in claim 25, further comprising electrical switch means wherein said circuit means includes printed circuit board means; and, actuator means movably received through said p.c. board means for operating said switch means in response to movement of said armature means.

28. The transducer defined in claim 25, further comprising electrical switch means; and, actuator means operatively connected to said armature means and said switch means for effecting actuation and deactuation of said switch means in response to movement of said armature means.

29. The transducer defined in claim 25, further comprising printed circuit board means including portion of said circuit means received on said housing, said p.c. board means retained on said housing means by said coil means.

30. The transducer defined in claim 25, further comprising printed circuit board means including portions of said circuit means received on said housing in spaced relationship to said pressure responsive means, with said coil means disposed intermediate said p.c. board means and said pressure responsive means.

31. The transducer defined in claim 25, further comprising printed circuit board means received on a plurality of lugs provided on said housing means and reatined thereon in spaced relationship to said coil means.

32. A pressure transducer comprising:
(a) housing means defining a fluid pressure chamber having an inlet port therein adapted for connection to a fluid pressure signal to be monitored.
(b) pressure responsive means disposed in said housing means and operable to move in response to changes in the pressure in said chamber;
(c) armature means formed of non-magnetic metallic material operatively connected to said pressure responsive means for movement therewith;
(d) tuned circuit means, including inductive reactance means disposed adjacent said armature means and including printed circuit means mounted to said inductive reactance means as a sub-assembly;
(e) means operative to shift resonance of said tuned circuit means, wherein the frequency of said resonance is shifted by movement of said armature means in response to pressure changes in said chamber; and,
(f) means operative to emit an electrical signal indicative of the shift in said frequency.

33. The device defined in claim 32, wherein said tuned circuit means includes a printed circuit board and said inductive reactance means includes a coil formed on a bobbin, said bobbin having at least one pin extending therefrom, said pin being received through said printed circuit board for retaining said printed circuit board on said bobbin thereby forming a subassembly for attachment onto said housing means.

34. The device in claim 32 further comprising auxiliary switch means with said inductive reactance means comprising a coil, said switch means including a non-metallic actuator member received through said coil for movement with respect thereto and operatively connected for actuating and deactuating said switch means in response to a predetermined amount of movement of said armature means.

35. The device defined in claim 32, wherein said inductive reactance means includes a coil, and further comprising switch means operatively connected for actuation and deactuation in response to predetermined movement of said armature means, said coil means being disposed intermediate said switch means and said armature means.

* * * * *